(12) United States Patent
Tojo et al.

(10) Patent No.: US 12,230,841 B2
(45) Date of Patent: Feb. 18, 2025

(54) BATTERY

(71) Applicant: KABUSHIKI KAISHA TOSHIBA, Tokyo (JP)

(72) Inventors: Akira Tojo, Naka (JP); Takahiro Aizawa, Yokohama (JP); Takashi Ito, Fujisawa (JP); Masatoshi Tanabe, Yokohama (JP); Yasunari Ukita, Kamakura (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 343 days.

(21) Appl. No.: 17/473,315

(22) Filed: Sep. 13, 2021

(65) Prior Publication Data

US 2022/0271399 A1     Aug. 25, 2022

(30) Foreign Application Priority Data

Feb. 25, 2021   (JP) .................................. 2021-028640

(51) Int. Cl.
*H01M 50/533*     (2021.01)
*H01M 50/543*     (2021.01)

(52) U.S. Cl.
CPC ....... *H01M 50/533* (2021.01); *H01M 50/543* (2021.01)

(58) Field of Classification Search
CPC .... H01M 5/533; H01M 50/543; H01M 50/55; H01M 50/552; H01M 50/555; H01M 50/103
See application file for complete search history.

(56) References Cited

U.S. PATENT DOCUMENTS

2009/0104518 A1* 4/2009 Nedelec ............. H01M 50/538
                                                           429/161
2009/0305134 A1* 12/2009 Ryu .................. H01M 10/0585
                                                           429/211

(Continued)

FOREIGN PATENT DOCUMENTS

JP        2002-042771 A       2/2002
JP        2011070918 A    *   4/2011

(Continued)

OTHER PUBLICATIONS

English translation of Uchida et al. (JP-2014182900-A). (Year: 2014).*

(Continued)

*Primary Examiner* — Haroon S. Sheikh
*Assistant Examiner* — Drew C Newman
(74) *Attorney, Agent, or Firm* — Oblon, McClelland, Maier & Neustadt, L.L.P.

(57) ABSTRACT

According to an embodiment, a battery includes an exterior container, a lid member, a plurality of electrode groups, a first lead, a second lead, and an electrode terminal. The lid member closes an opening of an inner cavity of the exterior container, and the plurality of electrode groups are stored in the inner cavity. A first current collecting tab protruding toward the lid member in a first electrode is joined with the first lead, and a second current collecting tab protruding toward the lid member in the second electrode different from the first electrode is joined with the second lead separate from the first lead. The first and second leads are together connected to the electrode terminal exposed on an outer surface of the lid member.

5 Claims, 6 Drawing Sheets

(56) References Cited

U.S. PATENT DOCUMENTS

| | | | |
|---|---|---|---|
| 2017/0309886 A1* | 10/2017 | Maeda | H01M 10/0525 |
| 2018/0261849 A1 | 9/2018 | Kawate et al. | |
| 2019/0013507 A1 | 1/2019 | Shinyashiki et al. | |
| 2020/0144583 A1* | 5/2020 | Kurita | H01M 50/533 |
| 2020/0373548 A1* | 11/2020 | Kozuki | H01M 50/54 |

FOREIGN PATENT DOCUMENTS

| | | | | |
|---|---|---|---|---|
| JP | 2012-113995 | | 6/2012 | |
| JP | 2013-191365 A | | 9/2013 | |
| JP | 2013-245628 A | | 12/2013 | |
| JP | 2014182900 A | * | 9/2014 | |
| JP | 2015-33874 A | | 2/2015 | |
| JP | 2015-041615 | | 3/2015 | |
| JP | 2015-130253 A | | 7/2015 | |
| JP | 2015219982 A | * | 12/2015 | |
| JP | WO 2017/038042 A1 | | 3/2017 | |
| JP | WO 2017/047789 A1 | | 3/2017 | |
| JP | 2019-040669 | | 3/2019 | |
| JP | 2019-40669 A | | 3/2019 | |
| WO | WO 2011/099491 A1 | | 8/2011 | |
| WO | WO 2017/038042 A1 | | 3/2017 | |
| WO | WO 2017/169868 A1 | | 10/2017 | |
| WO | WO-2018235428 A1 | * | 12/2018 | H01G 11/12 |
| WO | WO-2019163220 A1 | * | 8/2019 | H01M 10/0585 |

OTHER PUBLICATIONS

English translation of Tamaru et al. (JP-2015219982-A). (Year: 2015).*

English translation of Shimizu et al. (JP-2011070918-A). (Year: 2011).*

Office Action mailed Dec. 17, 2024 in Japanese Application No. 2021-028640 filed Feb. 25, 2021 (w/machine English translation).

* cited by examiner

BATTERY

CROSS-REFERENCE TO RELATED APPLICATIONS

This application is based upon and claims the benefit of priority from Japanese Patent Application No. 2021-028640, filed Feb. 25, 2021; the entire contents of which are incorporated herein by reference.

FIELD

Embodiments described herein relate to a battery.

BACKGROUND

In some batteries, such as a lithium ion secondary battery, an electrode group including a positive electrode and a negative electrode is housed in an inner cavity of an exterior container. In such a battery, the exterior container includes a bottom wall and a peripheral wall, and the inner cavity of the exterior container is open toward a side opposite the bottom wall in the height direction of the battery. A lid member is attached to the peripheral wall of the exterior container, with which an opening of the inner cavity is covered. In the battery, an electrode terminal is provided on the outer surface of the lid member, being exposed to the outside of the battery.

In some batteries, a plurality of electrode groups are housed in an inner cavity of an exterior container similar to the above-described one, and current collecting tabs of each of the electrode groups protrude toward a side where a lid member is located. In the inner cavity of such a battery, a connecting member, such as a lead, is arranged between the current collecting tab and the lid member in the height direction of the battery. The current collecting tab of each electrode group is electrically connected to an electrode terminal, with a connecting member, such as a lead, etc., being interposed therebetween.

In a battery in which current collecting tabs of multiple electrode groups protrudes toward side where the lid member is located, it is demanded that a space occupied by connecting members, such as leads, in the inner cavity be suppressed and a space occupied by the electrode groups in the inner cavity be increased. Furthermore, it is demanded that a high electrode group capacity be realized by increasing the space occupied by the electrode groups and without increasing the size of the battery.

DETAILED DESCRIPTION

According to an embodiment, a battery includes an exterior container, a lid member, a plurality of electrode groups, a first current collecting tab, a second current collecting tab, first lead, a second lead, and an electrode terminal. The exterior container includes a bottom wall and a peripheral wall, and an inner cavity, open toward a side opposite the bottom wall in the height direction, is formed in the exterior container. The lid member is attached to the peripheral wall of the exterior container in such a manner that it closes the opening of the inner cavity. Each of the electrode groups includes a positive electrode and a negative electrode, and the plurality of electrode groups are stored in the inner cavity of the exterior container. In a first electrode group, which is one of the electrode groups, the first current collecting tab protrudes toward the side where the lid member is located, and in a second electrode group, which is another electrode group among the electrode groups, the second current collecting tab protrudes toward the side where the lid member is located. The first current collecting tab is joined with the first lead. The second lead is formed to be separate from the first lead, and the second current collecting tab is joined with the second lead. The electrode terminal is exposed on the outer surface of the lid member, and the first lead and the second lead are together connected to the electrode terminal.

Hereinafter, the embodiments will be described with reference to the accompanying drawings.

First Embodiment

Figure 1:
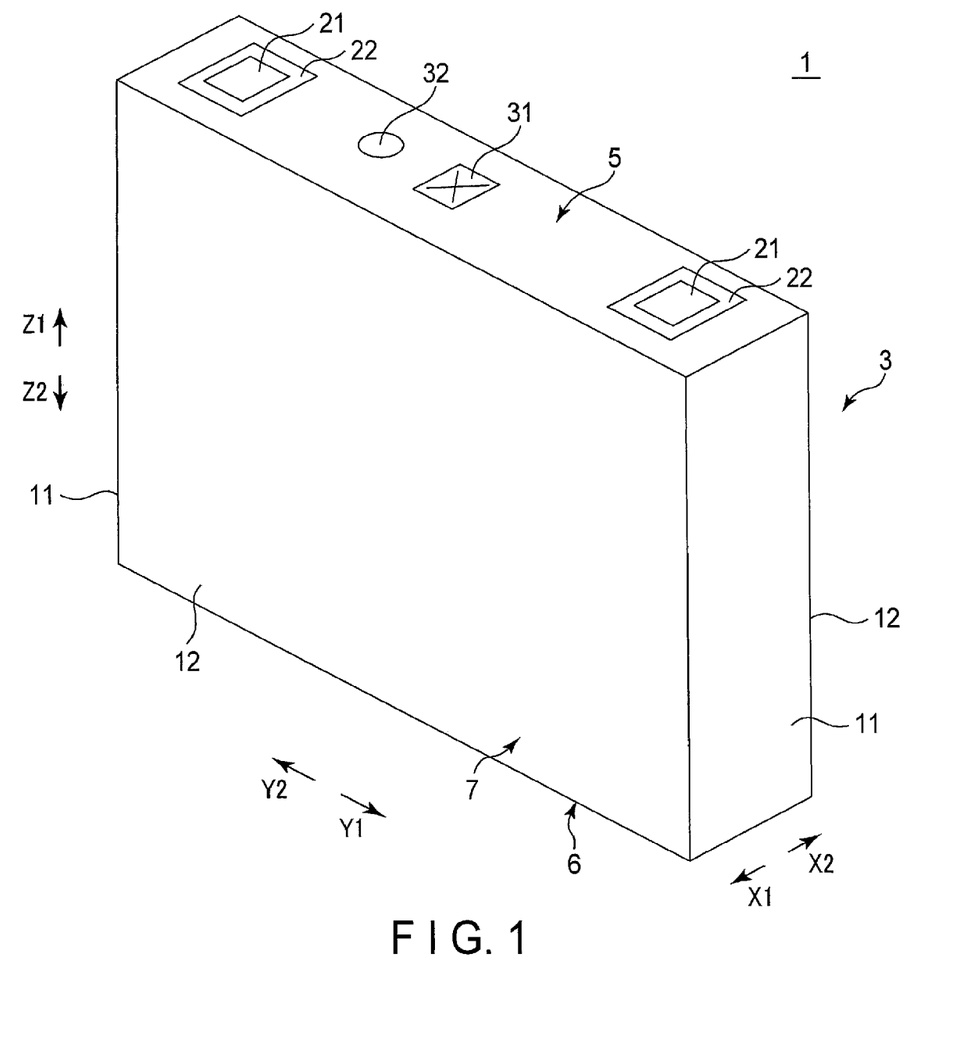
FIG. 1 is a perspective view schematically showing a battery according to a first embodiment.
Figure 2:
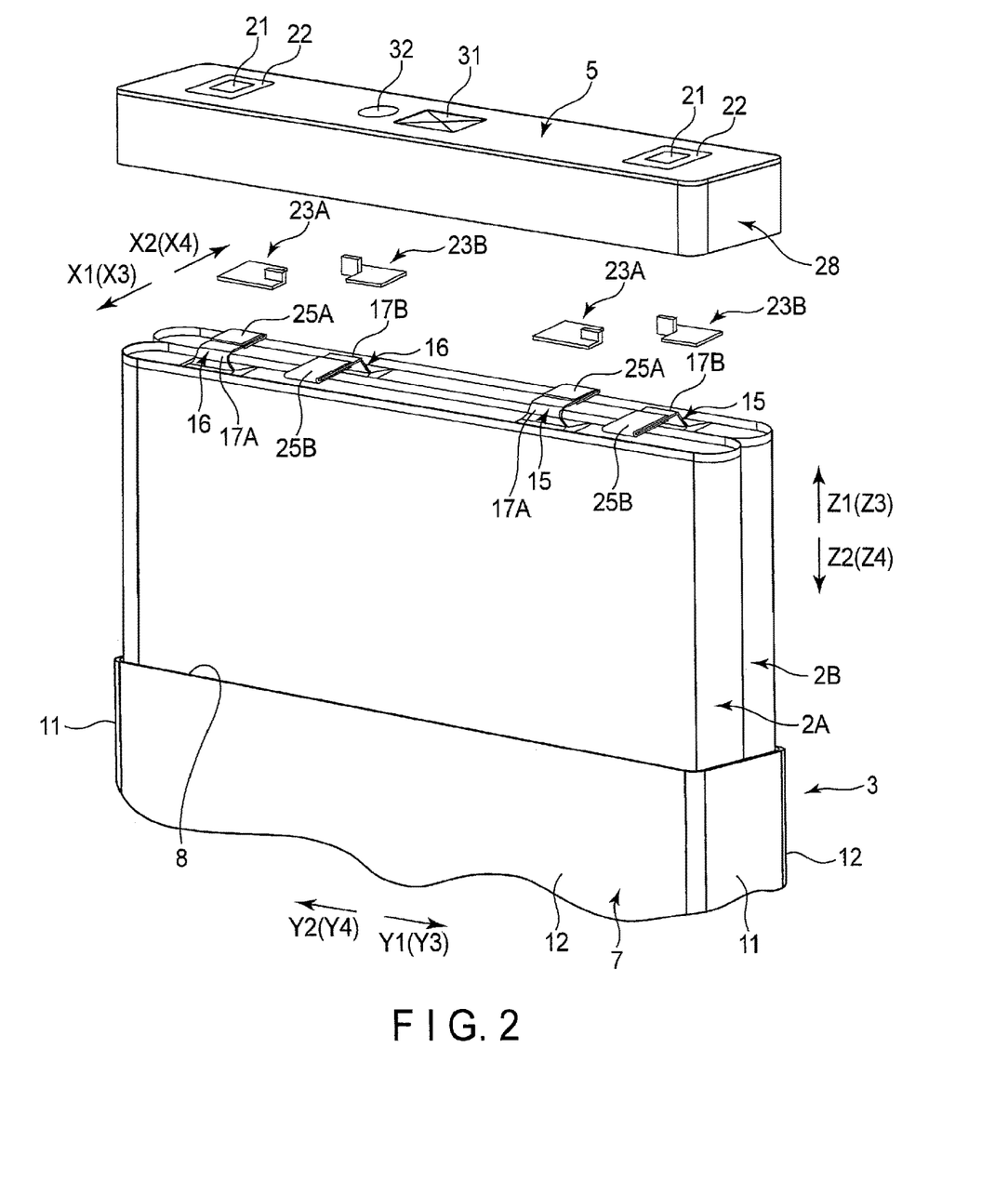
FIG. 2 is a perspective view schematically showing the battery according to the first embodiment disassembled.

FIGS. 1 and 2 show a battery 1 according to the first embodiment. As shown in FIGS. 1 and 2, the battery 1 includes a plurality of electrode groups 2A and 2B, an exterior container 3, and a lid member 5. Each of the exterior container 3 and the lid member 5 is formed of a metal such as aluminum, an aluminum alloy, iron, copper, or stainless steel. Herein, in the battery 1 (exterior container 3), a depth direction (the direction indicated by arrows X1 and X2), a lateral direction intersecting (orthogonal or approximately orthogonal to) the depth direction (the direction indicated by arrows Y1 and Y2), a height direction intersecting (orthogonal or approximately orthogonal to) the depth direction and the lateral direction (the direction indicated by arrows Z1 and Z2) are defined. The battery 1 and the container 3 each have a smaller dimension in the depth direction than both the dimension in the lateral direction and the dimension in the height direction. FIG. 1 is a perspective view of the battery 1, and FIG. 2 an exploded perspective view of the battery 1.

The exterior container 3 includes a bottom wall 6 and a peripheral wall 7. In the inside of the exterior container 3, an inner cavity 8 in which the electrode groups 2 are housed is defined by the bottom wall 6 and the peripheral wall 7. In the exterior container 3, the inner cavity 8 is open toward the side opposite a side at which the bottom wall 6 is positioned in the height direction. The peripheral wall 7 includes two pairs of side walls, side walls 11 and side walls 12. The side walls 11 that form one pair face each other with the inner cavity 8 intervening therebetween in the lateral direction. The side walls 12, which constitute a pair, face each other with the inner cavity 8 intervening therebetween in the depth direction. Each of the side walls 11 continuously extends in the depth direction between the side walls 12. Each of the side walls 12 continuously extends in the lateral direction between the side walls 11. The lid member 5 is attached to the peripheral wall 7 at an end opposite the bottom wall 6. Therefore, the lid member 5 covers an opening of the inner cavity 8 of the exterior container 3. The lid member 5 and the bottom wall 6 face each other with the inner cavity 8 intervening therebetween in the height direction.

In the example shown in FIG. 1, etc., two electrode groups 2A and 2B are arranged in the inner cavity 8. In the inner cavity 8, a plurality of (two) electrode groups 2A and 2B are arranged side by side according to the depth direction. The electrode group (first electrode group) 2A is arranged adjacently to the electrode group (second electrode group) 2B in the depth direction. Each of the electrode groups 2A and 2B includes a positive electrode 15 and a negative electrode 16. In each of the electrode groups 2A and 2B, a separator (not shown) intervenes between the positive electrode 15 and the negative electrode 16. In each of the electrode groups 2A and 2B, the separator is made of a material having electrical insulation properties, and electrically insulates the positive electrode 15 from the negative electrode 16. The electrode group 2A includes a pair of current collecting tabs (first current collecting tabs) 17A, and the electrode group 2B includes a pair of current collecting tabs (second current collecting tabs) 17E.

In each of the electrode groups 2A and 2B, the positive electrode 15 includes a positive electrode current collector, such as a positive electrode current collecting foil, and a positive electrode active material-containing layer (not shown) supported on the surface of the positive electrode current collector. The positive electrode current collector is, but not limited to, for example, an aluminum foil or an aluminum alloy foil, which has a thickness of about 5 µm to 20 µm. The positive electrode active material-containing layer includes a positive electrode active material, and may optionally contain a binder and an electro-conductive agent. The positive electrode active material is, but not limited to, for example, oxides, sulfides, and polymers, which can occlude and release lithium ions. In the electrode group 2A, the part not supporting the positive electrode active material-containing layer in the positive current collector serves as a positive electrode current collecting tab (a first positive electrode current collecting tab) that constitutes one of the pair of current collecting tabs 17A. In the electrode group 2B, the part not supporting the positive electrode active material-containing layer in the positive current collector serves as a positive electrode current collecting tab (a second positive electrode current collecting tab) that constitutes one of the pair of current collecting tabs 17B.

In each of the electrode groups 2A and 2B, the negative electrode 16 includes a negative electrode current collector, such as a negative electrode current collecting foil, and a negative electrode active material-containing layer (not shown) supported on the surface of the negative electrode current collector. The negative electrode current collector is, but not limited to, for example, an aluminum foil, an aluminum alloy foil, or a copper foil, having a thickness of about 5 µm to 20 µm. The negative electrode active material containing layer includes a negative electrode active material and may contain a binder and a conductive agent as appropriate. The negative electrode active material is for example, although not limited thereto, a metal oxide, a metal sulfide, a metal nitride, or a carbon material that can occlude and release lithium ions. In the electrode group 2A, the part not supporting the negative electrode active material-containing layer in the negative current collector serves as a negative electrode current collecting tab (a first negative electrode current collecting tab) that constitutes another one of the pair of current collecting tabs 17A different from the positive electrode current collecting tab. In the electrode group 2B, the part not supporting the negative electrode active material-containing layer in the negative current collector serves as a negative electrode current collecting tab (a second negative electrode current collecting tab) that constitutes another one of the pair of current collecting tabs 17B different from the positive electrode current collecting tab.

In each of the electrode groups 2A and 2B, a length direction (a direction indicated by arrows Z3 and Z4), a width direction (a direction indicated by arrows Y3 and Y4) intersecting (orthogonal to or substantially orthogonal to) the length direction, and a thickness direction (a direction indicated by arrows X3 and X4) intersecting (orthogonal to or substantially orthogonal to) both the length direction and the width direction. In each of the electrode groups 2A and 2B, the dimension in the thickness direction is smaller than both the dimension in the length direction and the dimension in the width direction. Each of the electrode groups 2A and 2B is formed in a flat shape.

In the electrode group 2A, the pair of current collecting tabs (positive electrode current collecting tab and a negative electrode current collecting tab) 17A protrudes from one side of the length direction with respect to the positive electrode active material-containing layer, the negative electrode active material-containing layer, and the separator, and the pair of current collecting tabs 17A protrudes from the same side in the length direction. Furthermore, in the electrode group 2A, the current collecting tabs 17A constituting the pair are formed separate from each other in the width direction. In the electrode group 2B, the pair of current collecting tabs (positive electrode current collecting tab and a negative electrode current collecting tab) 17B protrudes from one side of the length direction with respect to the positive electrode active material-containing layer, the negative electrode active material-containing layer, and the separator, and the pair of current collecting tabs 17B protrudes from the same side in the length direction. In the electrode group 2B, the current collecting tabs 17B constituting a pair are arranged separately from each other in the width direction.

In one example, in each of the electrode groups 2A and 2B, the positive electrode 15, the negative electrode 16, and the separator are wound around the winding axis, with the separator being interposed between the positive electrode active material containing layer and the negative electrode active material containing layer, and each of the electrode groups 2A and 2B having a winding structure. In another example, each of the electrode groups 2A and 2B has a stack structure in which a plurality of positive electrodes 15 and a plurality of negative electrodes 16 are alternately laminated, with the separator interposed therebetween. In the electrode group 2A, a plurality of band-shaped portions are bundled at each of the current collecting tabs 17A constituting a pair; in the electrode group 2B, a plurality of band-shaped portions are bundled at each of the current collecting tabs 17B constituting a pair.

In the present embodiment, each of the electrode groups 2A and 2B is arranged in the inner cavity 8 in such a manner that the length direction corresponds, or approximately corresponds, to the height direction of the battery 1. Furthermore, in each of the electrode groups 2A and 2B, the width direction corresponds, or approximately corresponds, to the lateral direction of the battery 1, and the thickness direction corresponds, or approximately corresponds, to the depth direction of the battery 1. The electrode group 2A is arranged in the inner cavity 8 in such a manner that a pair of current collecting tabs 17A protrudes toward the side where the lid member 5 is located in the height direction of the battery 1, and the electrode group 2B is arranged in the inner cavity 8 in such a manner that a pair of current collecting tabs 17B protrudes toward the side where the lid member 5 is located in the height direction of the battery 1. In the electrode group 2A, the current collecting tabs 17A constituting a pair are arranged to be separate from each other in the lateral direction of the battery 1, and the positive electrode current collecting tab (one of the tabs 17A) is not in contact with the negative electrode current collecting tab (the other of the tabs 17A). In the electrode group 2B, the current collecting tabs 17B constituting a pair are arranged to be separate from each other in the lateral direction of the battery 1, and the positive electrode current collecting tab (one of the tabs 17B) is not in contact with the negative electrode current collecting tab (the other of the tabs 17B).

In the inner cavity 8, each of the electrode group 2A and 2B holds (is impregnated with) an electrolytic solution (not shown). The electrolytic solution may be a nonaqueous electrolytic solution obtained by dissolving an electrolyte in an organic solvent, or an aqueous electrolytic solution such as an aqueous solution. Instead of the electrolytic solution, either a gel electrolyte or a solid electrolyte may be used. In the case where a solid electrolyte is used as an electrolyte, the solid electrolyte instead of the separator intervenes between the positive electrode 15 and the negative electrode 16 in each of the electrode groups 2A and 2B. In such a case, in each of the electrode groups 2A and 2B, the positive electrode 15 is electrically insulated from the negative electrode 16 by the solid electrolyte.

In the battery 1, a pair of terminals 21 are attached to the lid member 5. The electrode terminals 21 are made of an electro-conductive material such as a metal. One of the electrode terminals 21 constituting a pair is a positive electrode terminal of the battery 1, and the other terminal 21 different from the positive electrode terminal is a negative electrode terminal of the battery 1. Each of the electrode terminals 21 is arranged on the outer surface of the lid member 5, being exposed to the outside of the battery 1. Furthermore, the terminals 21 in a pair are arranged to be separate from each other in the lateral direction of the battery 1. On the outer surface of the lid member 5, an insulating member 22 is provided between each terminal 21 and the lid member 5. Each of the electrode terminals 21 is electrically insulated from the lid member 5 and the exterior container 3 by the insulating member 22, etc.

Two pairs of leads 23A and 23B and two pairs of clip plates 25A and 25B are arranged in the inner cavity 8 of the exterior container 3. Each of the leads 23A and 23B and the clip plates 25A and 25B are made of an electrically conductive material such as a metal, for example aluminum, stainless steel, copper, or iron, etc. The leads 23A and 23B and the clip plates 25A and 25B are formed in separate bodies. In the inner cavity 8, the leads 23A and 232 and the clip plates 25A and 25B are arranged between each of the electrode groups 2A and 2B and the lid member 5 in the height direction of the battery 1.

Each of the current collecting tabs (first current collecting tabs) 17A in a pair in the electrode group 2A is joined with the corresponding one of the leads (first leads) 23A in a pair, with the corresponding one of the clip plates (first clip plates) 25A in a pair being interposed therebetween. Herein, one of the leads 23A is a positive electrode-side lead (first positive electrode-side lead), and the other different from the positive electrode-side lead is a negative electrode-side lead (first negative electrode-side lead). One of the clip plates 25A is a positive electrode-side clip plate (first positive electrode-side clip plate), and the other different from the positive electrode-side clip plate is a negative electrode-side clip plate (first negative electrode-side clip plate).

Each of the leads 23A in a pair is connected to the corresponding one of the electrode terminals 21 in a pair. For this reason, the positive electrode current collecting tab (one of the tabs 17A) of the electrode group 2A is electrically connected to the positive electrode terminal (one of the terminals 21), with the positive electrode-side clip plate (one of the clip plates 25A) and the positive electrode-side lead (one of the leads 23A) being interposed therebetween, in this order. The negative electrode current collecting tab (the other of the tabs 17A different from the positive electrode current collecting tab) of the electrode group 2A is electrically connected to the negative electrode terminal (the other of the terminals 21 different from the positive electrode terminal), with the negative electrode-side clip plate (the other of the clip plates 25A different from the positive electrode-side clip plate) and the negative electrode-side lead (the other of the leads 23A different from the positive electrode-side lead) being interposed therebetween, in this order.

With the above-described structure, at least a part of an electric path between the positive electrode current collecting tab (one of the tabs 17A) of the electrode group 2A and the positive electrode terminal (one of the terminals 21) is constituted by the positive electrode-side clip plate (one of the clip plates 25A) and the positive electrode-side lead (one of the leads 23A). At least a part of an electric path between the negative electrode current collecting tab (the other of the tabs 17A) of the electrode group 2A and the negative electrode terminal (the other of the terminals 21) is constituted by the negative electrode-side clip plate (the other of the clip plates 25A) and the negative electrode-side lead (the other of the leads 23A).

A member constituting the electric path between the positive electrode current collecting tab (one of the tabs 17A) of the electrode group 2A and the positive electrode terminal (one of the terminals 21), such as the positive electrode-side lead (one of the leads 23A), is arranged to be separate from a member constituting the electric path between the negative electrode current collecting tab (the other of the tabs 17A) of the electrode group 2A and the negative electrode terminal (the other of the terminals 21), such as the positive electrode-side lead (the other of the leads 23A), according to the lateral direction of the battery 1. Thus, the member constituting the electric path between the positive electrode current collecting tab (one of the tabs 17A) of the electrode 2A and the positive electrode terminal (one of the terminals 21) is not in contact with the member constituting the electric path between the negative electrode current collecting tab (the other of the tabs 17A) of the electrode group 2A and the negative electrode terminal (the other of the terminals 21).

Each of the current collecting tabs (second current collecting tabs) 17B as a pair in the electrode group 2B is joined with the corresponding one of the leads (second leads) 23B as a pair, with the corresponding one of the clip plates (second clip plates) 25B as a pair being interposed therebetween. Herein, one of the leads 23B is a positive electrode-side lead (second positive electrode-side lead), and the other different from the positive electrode-side lead is a negative electrode-side lead (second negative electrode-side lead). One of the clip plates 25B is a positive electrode-side clip plate (second positive electrode-side clip plate), and the other different from the positive electrode-side clip plate is a negative electrode-side clip plate (second negative electrode-side clip plate).

Each of the leads 23B in a pair is connected to the corresponding one of the electrode terminals 21 in a pair. For this reason, the positive electrode current collecting tab (one of the tabs 17B) of the electrode group 2B is electrically connected to the positive electrode terminal (one of the terminals 21), with the positive electrode-side clip plate (one of the clip plates 25B) and the positive electrode-side lead (one of the leads 23B) being interposed therebetween, in this order. The negative electrode current collecting tab (the other of the tabs 17D different from the positive electrode current collecting tab) of the electrode group 2B is electrically connected to the negative electrode terminal (the other of the terminals 21 different from the positive electrode terminal), with the negative electrode-side clip plate (the other of the clip plates 25B different from the positive electrode-side clip plate) and the negative electrode-side lead (the other of the leads 23B different from the positive electrode-side clip plate) being interposed therebetween, in this order.

With the above-described structure, at least a part of an electric path between the positive electrode current collecting tab (one of the tabs 17B) of the electrode group 2B and the positive electrode terminal (one of the terminals 21) is constituted by the positive electrode-side clip plate (one of the clip plates 25B) and the positive electrode-side lead (one of the leads 23B). At least a part of an electric path between the negative electrode current collecting tab (the other of the tabs 17B) of the electrode group 2B and the negative electrode terminal (the other of the terminals 21) is constituted by the negative electrode-side clip plate (the other of the clip plates 25B) and the negative electrode-side lead (the other of the leads 23B).

A member constituting the electric path between the positive electrode current collecting tab (one of the tabs 17B) of the electrode group 2B and the positive electrode terminal (one of the terminals 21), such as the positive electrode-side lead (one of the leads 23B), is arranged to be separate from a member constituting the electric path between the negative electrode current collecting tab (the other of the tabs 17B) of the electrode group 2B and the negative electrode terminal (the other of the terminals 21), such as the negative electrode lead electrode-side lead (the other of the leads 23B), according to the lateral direction of the battery 1. Thus, the member constituting the electric path between the positive electrode current collecting tab (one of the tabs 17B) of the electrode group 2B and the positive electrode terminal (one of the terminals 21) is not in contact with the member constituting the electric path between the negative electrode current collecting tab (the other of the tabs 17B) of the electrode group 2B and the negative electrode terminal (the other of the terminals 21).

In the battery 1 of the present embodiment, as described above, electrical connection structures of the electrode groups 2A and 2B to each pair of the electrode terminals 21 are formed, and a pair of electrical connection structures is thereby formed. To each of the electrode terminals 21 in a pair, the corresponding one of the leads (first leads) 23A in a pair and corresponding one of the leads (second leads) 23B in a pair are connected in conjunction. In other words, in each of the electrical connection structures in a pair, two (multiple) leads 23A and 23B are connected in conjunction to the electrode terminal 21. For example, two positive electrode-side leads (one of the leads 23A and one of the leads 23B) are connected to the positive electrode terminal, which is one of the electrode terminals 21 in a pair, and two negative electrode-side leads (the other of the leads 23A and the other of the leads 23B) are connected to the negative electrode terminal, which is the other of the electrode terminals 21 in a pair.

A spacer 28 is housed in the inner cavity 8 of the exterior container 3. The spacer 28 is made of an electrically insulating material. The spacer 28 is arranged between each of the electrode groups 2A and 2B and the lid member 5 in the height direction of the battery 1. In the inner cavity 8, the spacer 28, etc. prevent two pairs of the current collecting tabs 17A and 17B, two pairs of leads 23A and 23B and two pairs of clip plates 25A and 25B from being in contact with the exterior container 3 and the lid member 5. For this reason, the current collecting tabs 17A and 17B, the leads 23A and 23B, the clip plates 25A and 25B are electrically insulated from the exterior container 3 and the lid member 5. The spacer 28 presses the electrode groups 2A and 2B against the side where the bottom wall 6 is located in the height direction of the battery 1. Thus, in the inner cavity 8, the movement of each of the electrode groups 2A and 2B along the height direction of the battery 1 is restricted.

In one example illustrated in FIGS. 1 and 2, etc., the lid member 5 is provided with a safety valve 31 and a liquid inlet (not shown). On the outer surface of the lid member 5, a sealing plate 32 to seal the liquid inlet is welded. The safety valve 31 and the liquid inlet are arranged between the electrode terminals 21 constituting a pair in the lateral direction of the battery 1. In one example, the battery 1 may not be provided with the safety valve 31 and the liquid inlet.

Figure 3:
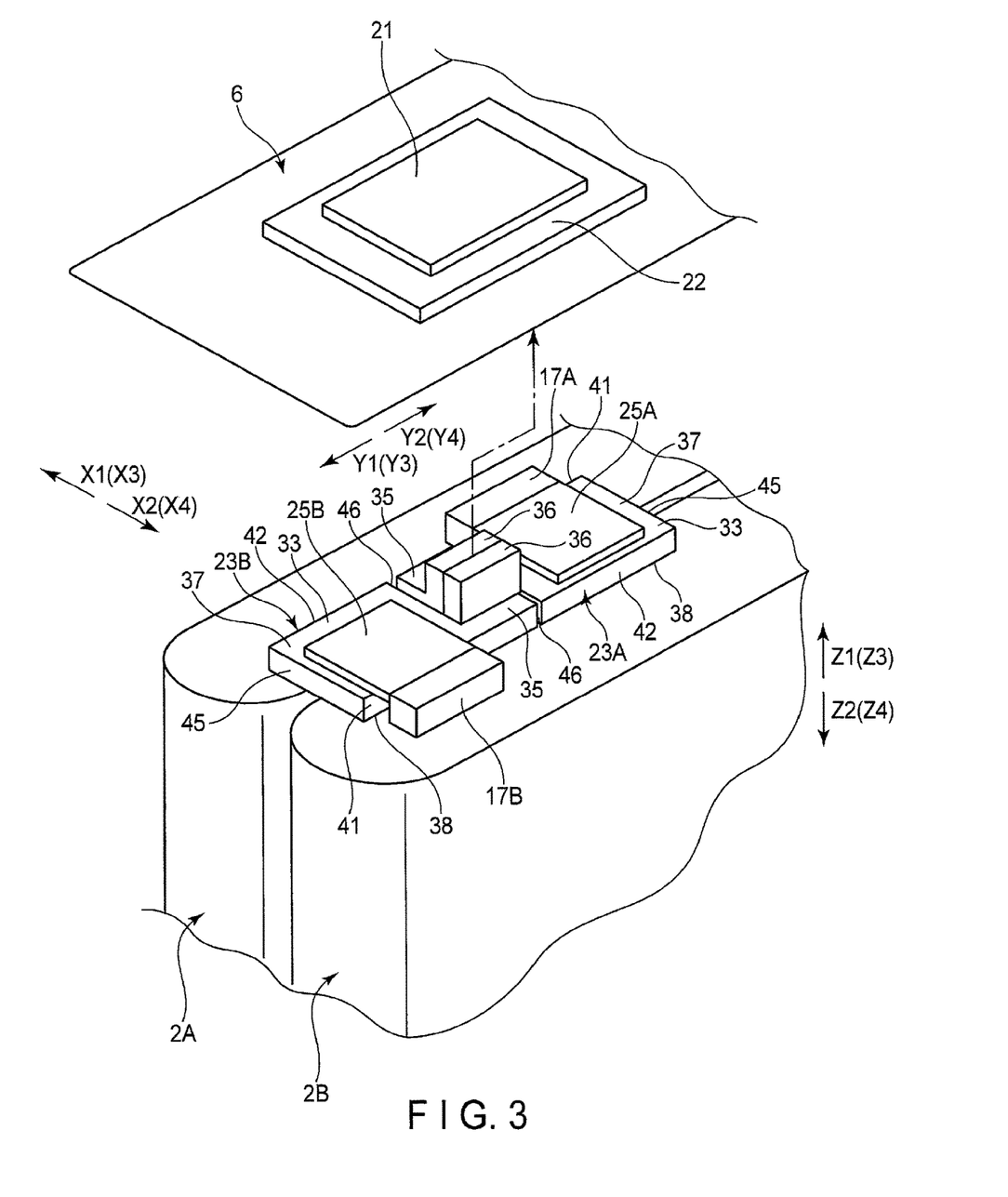
FIG. 3 is a perspective view schematically showing a configuration of an electric connection structure of a plurality of electrode groups with respect to an electrode terminal in a pair and the vicinity thereof in the battery according to the first embodiment.
Figure 4:
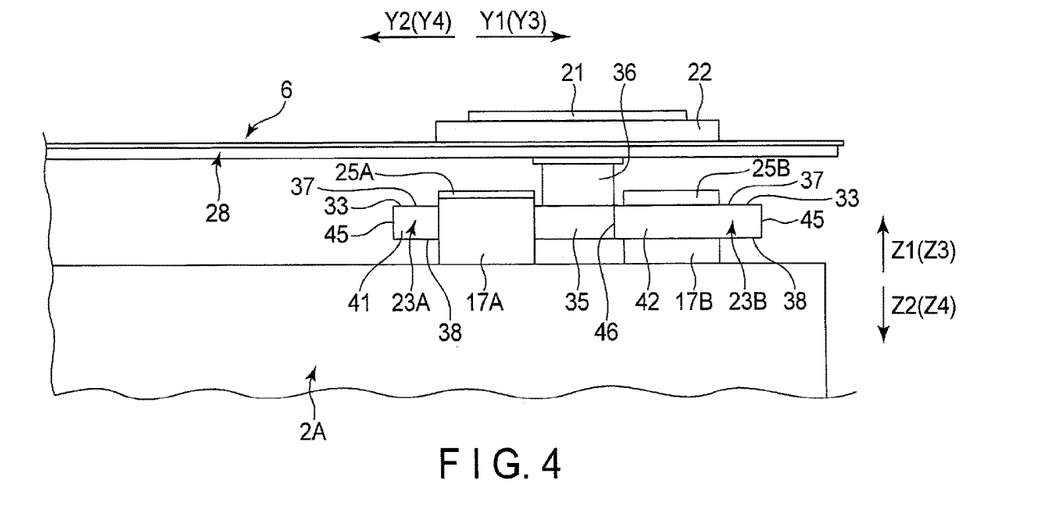
FIG. 4 is a schematic view showing a configuration of an electrical connection structure of a plurality of electrode groups with respect to an electrode terminal in a pair and the vicinity thereof, viewed from one side of the depth direction of the battery, in the battery according to the first embodiment.
Figure 5:
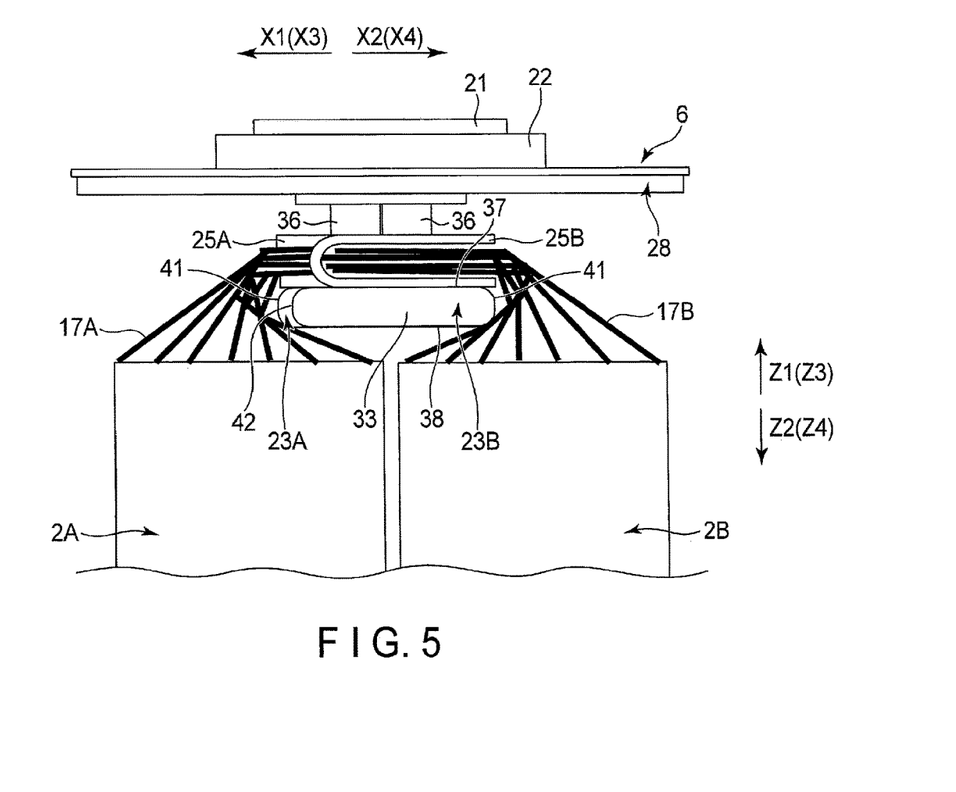
FIG. 5 is a schematic view showing a configuration of an electrical connection structure of a plurality of electrode groups with respect to an electrode terminal in a pair and the vicinity thereof, viewed from one side of the lateral direction of the battery, in the battery according to the first embodiment.

In the following, the electrical connection structure of the electrode groups 2A and 2B to each of the electrode terminals 21 in a pair, namely, the above-described pair of electrical connection structures, is described. FIGS. 3 to 5 show an electrical connection structure of a plurality of electrode groups 2A and 2B to one of the electrode terminals 21 in a pair and the vicinity of the structure, and show one of the electrical connection structures in a pair and the vicinity of the structure. FIG. 3 is a perspective view showing a state in which the leads 23A and 23B are not connected to the electrode terminals 21. FIG. 4 shows the battery 1 viewed from one side of the depth direction, and FIG. 5 shows the battery 1 viewed from one side of the lateral direction.

Figure 6:
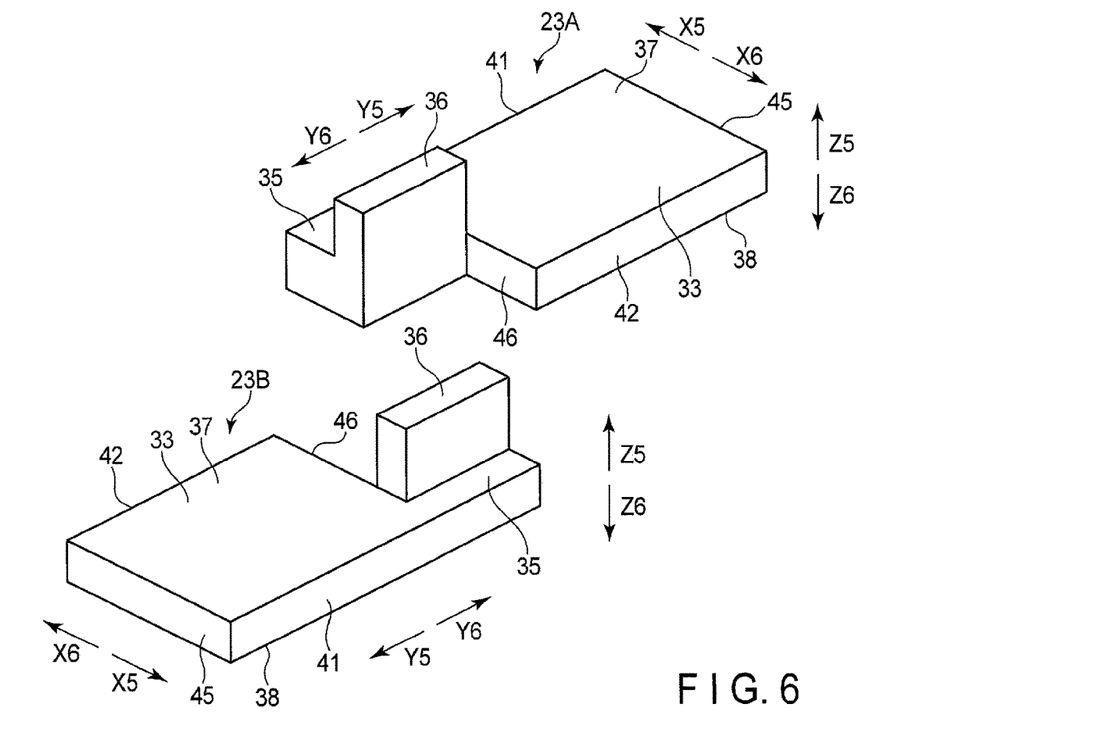
FIG. 6 is a perspective view schematically showing one of the paired leads (first lead) and one of the different paired leads (second lead) in the battery according to the first embodiment.

FIG. 6 shows one of the leads (first leads) 23A in a pair and one of the leads (second leads) 23B in a pair. FIGS. 3 to 5 show only the electrical connection structure of the electrode groups 2A and 2B to one of the electrode terminals 21 in a pair; however, the electrical connection structure of the electrode groups 2A and 2B to the other of the electrode terminals 21 is the same as that shown in FIGS. 3 to 5. FIGS. 3 to 6 show one of the leads 23A in a pair and one of the leads 23B in a pair; however, the structures of the other lead 23A and the other lead 23B are the same as those shown in FIGS. 3 to 6.

As shown in FIGS. 3 to 5, in each of the electrical connection structure in a pair, the clip plate 25A is attached to the protruding end of the current collecting tab 17A and the vicinity thereof, and the clip plate 25B is attached to the protruding end of the current collecting tab 17B and the vicinity thereof. Each pair of the clip plates 25A sandwiches bundled multiple band-shaped portions in the corresponding one of the current collecting tabs 17A in a pair, and each pair of the clip plates 25B sandwiches bundled multiple band-shaped portions in the corresponding one of the current collecting tabs 17B in a pair. In each pair of electrical connection structures, the current collecting tabs 17A and 17B are arranged in a shifted layout in the lateral direction of the battery 1, and the current collecting tabs 17A and 17B are not in contact with each other.

As shown in FIG. 6, etc., in each of the pairs of leads (first leads) 23A and each of the pairs of leads (second leads) 23B, a length direction (a direction indicated by arrows Y5 and Y6), a width direction (a direction indicated by arrows X5 and X6) intersecting (orthogonal to or substantially orthogonal to) the length direction, and a height direction (a direction indicated by arrows Z5 and Z6) intersecting (orthogonal to or substantially orthogonal to) both the length direction and the width direction are all defined. Each of the leads 23A and 23B includes a lead base part 33, a lead protruding part 35, and a lead bent part 36.

In each of the leads 23A and 23B, the lead base part 33 is formed in the shape of a plate, and the direction of the plate thickness of the lead base part 33 corresponds, or approximately corresponds, to the height direction. The lead base part 33 of each of the leads 23A and 23B includes a pair of base part main surfaces 37 and 38. In each of the leads 23A and 23B, the base part main surface (first base part main surface) 37 faces one side of the height direction, and the base part main surface (second base part main surface) 38 faces the opposite side of the side faced by the base part main surface 37 according to the height direction.

In each of the leads 23A and 23B, the lead base part 33 includes base part edge surfaces 41, 42, 45, and 46. In each of the leads 23A and 23B, the base part edge surface (first base part edge surface) 41 constitutes the edge of the one side of the width direction in the lead base part 33, and the base part edge surface (second base part edge surface) 42 constitutes the edge of the other side of the width direction which is opposite the base part edge surface 41 in the lead base part 33. Furthermore, in each of the leads 23A and 23B, each of the base part main surface 37 and 38 extends along the width direction in the lead base part 33, from the base part edge surface 41 to the base part edge surface 42.

In each of the leads 23A and 23B, the base part edge surface 45 constitutes the edge of the one side of the length direction in the lead base part 33, and the base part edge surface 46 constitutes the edge of the other side of the length direction which is opposite the base part edge surface 45 in the lead base part 33. Furthermore, in each of the leads 23A and 23B, each of the base part main surface 37 and 38 extends along the length direction in the lead base part 33, from the base part edge surface 45 to the base part edge surface 46.

In the lead base part 33 of each of the leads 23A and 23B, as shown in FIG. 5, etc., it is preferable that the boundary between each of the base part main surfaces 37 and 38 and the base part edge surface 41, and also the boundary between each of the base part main surfaces 37 and 38 and the base part edge surface 42 take the shape of an "R" (a arc shape). In this case, in each of the leads 23A and 23B, the boundary between each of the base part main surfaces 37 and 38 and the base part edge surface 41 takes the shape of an arc, as does the boundary between each of the base part main surfaces 37 and 38 and the base part edge surface 42, in the cross section of the lead base part 33 orthogonal to (or approximately orthogonal to) the length direction.

In each of the leads 23A and 23B, the lead protruding part 35 protrudes from the base part edge surface 46 of the lead base part 33 toward one side of the length direction, and protrudes from the base part edge surface 46 toward the side opposite the side where the base part edge surface 45 is located in the length direction. Furthermore, in each of the leads 23A and 23B, the lead protruding part 35 is connected to the end portion on the side where the base part edge surface 41 is located in the base part edge surface 46 of the lead base part 33. In each of the leads 23A and 23B, the lead protruding part 35 is formed in the shape of a plate, and the direction of the plate thickness of the lead protruding part 35 corresponds, or approximately corresponds, to the height direction.

In each of the leads 23A and 23B, the lead bent part 36 is bent relative to the lead protruding part 35 toward one side of the height direction and bent toward the side faced by the base part main surface 37 of the lead base part 33 in the height direction. Furthermore, in each of the leads 23A and 23B, the lead bent part 36 is connected to the end portion of the lead protruding part 35 on the side opposite that where the base part edge surface 41 is located. In each of the leads 23A and 23B, the lead bent part 36 is formed in the shape of a plate, and its direction of the plate thickness corresponds, or approximately corresponds, to the width direction. In each of the leads 23A and 23B, the lead bent part 36 protrudes toward the side faced by the base part main surface 37 with respect to the lead base part 33 and the lead protruding part 35. In each of the leads 23A and 23B, the lead bent part 36 is arranged either at, or approximately at, the center position in the width direction.

Since the leads 23A and 23B are formed in the above-described manner, each of the leads 23A and 23B is either in the shape or approximate shape of a "T" in projection in the length direction. In each of the leads 23A and 23B, the cross section orthogonal, or approximately orthogonal, to the length direction that passes the lead protruding part 35 and the lead bent part 36 is either in the shape or approximate shape of an "L". The leads 23A and 23B are formed in the same, or approximately the same, shape.

In the battery 1, each of the leads 23A and 23B is arranged in the inner cavity 8 in such a manner that the width direction corresponds, or approximately corresponds, to the depth direction of the battery 1. Furthermore, in each of the leads 23A and 23B arranged in the in the inner cavity 8, the length direction corresponds, or approximately corresponds, to the lateral direction of the battery 1 and the height direction corresponds, or approximately corresponds, to the height direction of the battery 1.

In each of the leads 23A and 23B arranged in the inner cavity 8, the base part main surface (first base part main surface) 37 of the lead base part 33 faces the side where the lid member 5 is located in the height direction of the battery 1. In each of the leads 23A and 23B, the lead base main surface (second base main surface) of the lead base part 33 faces the side where the electrode groups 2A and 2B are located according to the height direction of the battery 1. In one example, in each of the leads 23A and 23B, the base part main surfaces 37 and 38 are parallel to, or approximately parallel to, the depth direction and the lateral direction of the battery 1, and are parallel to, or approximately parallel to, the inner surface and the outer surface of the lid member 5. In this case, in each of the leads 23A and 23B, the base part main surfaces 37 and 38 are orthogonal, or approximately orthogonal to, the height direction of the battery 1.

As the leads 23A and 23B are arranged in the inner cavity 8 as described above, in the lead base part 33 of each of the leads 23A and 23B, the base part edge surface (first base pat edge surface) 41 constitutes the edge of one side in the depth direction of the battery 1, and the base part edge surface (second base part edge surface) 42 constitutes the edge opposite the base part edge surface 41 in the depth direction of the battery 1. In the lead base part 33 of each of the leads 23A and 23B, the base part edge surface 45 constitutes the edge of one side in the lateral direction of the battery 1, and the base part edge surface 46 constitutes the edge opposite the base part edge surface 45 in the lateral direction of the battery 1.

In each of the electrical connection structures in a pair, the current collecting tab (first current collecting tab) 17A is joined with the lead base part (first lead base part) 33 of the lead 23A, and the current collecting tab (second current collecting tab) 17B is joined with the lead base part (second lead base part) 33 of the lead 23B. In the present embodiment, in each of the leads 23A, a joint part connected to the corresponding one of the current collecting tabs 17A is formed in the base part main surface 37 of the lead base part 33. In each of the leads 23B, a joint part connected to the corresponding one of the current collecting tabs 17B is formed in the base part main surface 37 of the lead base part 33.

In each pair of electrical connection structures, the leads 23A and 23B are arranged in a shifted layout in the lateral direction of the battery 1. In each of the electrical connection structures in a pair, the lead base part 33 of the lead 23A is located on the opposite side of the lead base part 33 of the lead 23B with respect to the electrode terminal 21, in the lateral direction of the battery 1. Therefore, in each of the electrical connection structures in a pair, the joint portion where the current collecting tab 17A is connected to the lead base part 33 of the lead 23A is located on the opposite side of the joint portion where the current collecting tab 17B is connected to the lead base part 33 of the lead 23B, with respect to the electrode terminal 21.

In each of the electrical connection structures in a pair, the lead protruding part (first lead protruding part) 35 and the lead bent part (first lead bent part) 36 of the lead 23A are either not shifted, or minimally shifted, in the lateral direction of the battery 1, with respect to the lead protruding part (second lead protruding part) 35 and the lead base part (second lead base part) 36 of the lead 23B. Furthermore, in each of the electrical connection structures in a pair, the lead protruding parts 35 and the lead bent parts 36 of the leads 23A and 23B are either not shifted, or minimally shifted, in the lateral direction of the battery 1, from the electrode terminal 21. In each of the electrical connection structures in a pair, the lead protruding part 35 of the lead (first lead) 23A protrudes in the lateral direction of the battery 1 toward the lead 23B. Furthermore, in each of the electrical connection structures in a pair, the lead protruding part 35 of the lead (second lead) 23B protrudes in the lateral direction of the battery 1 toward the lead 23A.

In each of the leads 23A and 23B arranged in the inner cavity 8, the lead bent part 36 is bent in the height direction of the battery 1 toward the side where the lid member 5 is located with respect to the lead protruding part 35. For this reason, in each of the electrical connection structures in a pair, the lead bent part 36 in each of the leads 23A and 23B protrudes toward the side where the lid member 5 is located with respect to the lead base part 33 and the lead protruding part 35. In each of the electrical connection structures in a pair, each of the leads 23A and 23B is connected to the electrode terminal 21 at the lead bent part 36. Furthermore, in each of the electrical connection structures in a pair, the joint portion where the current collecting tab 17A is connected to the lead base part 33 of the lead 23A is located on the opposite side of the joint portion where the current collecting tab 17B is connected to the lead base part 33 of the lead 23B, with respect to the parts where the leads 23A and 23B are connected to the electrode terminal 21.

In each of the electrical connection structures in a pair, the lead bent part (second lead bent part) 36 of the lead 23B is adjacent to the lead bent part (first lead bent part) 36 of the lead 23A from one side of the depth direction of the battery 1. Furthermore, in each of the electrical connection structures in a pair, the lead bent parts 36 of the leads 23A and 23B are located between the lead protruding part 35 of the lead 23A and the lead protruding part 35 of the lead 23B in the depth direction of the battery 1. In each pair of electrical connection structures, the leads 23B are arranged at a position when the lead 23A is rotated around the center axis of the electrode terminal 21 either 180 degrees or approximately 180 degrees. Thus, in each of the electrical connection structures in a pair, the leads 23A and 23B are arranged either symmetrically or approximately symmetrically to each other with respect to the center axis of the electrode terminals 21. The center axis of each of the electrode terminals 21 is along the height direction of the battery 1.

As described above, in the present embodiment, in each of the electrical connection structures in a pair, the current collecting tab (first current collecting tab) 17A of the electrode group (first electrode group) 2A is joined with the lead (first lead) 23A, and the current collecting tab (second current collecting tab) 17B of the electrode group (second electrode group) 2B is joined with the lead (second lead) 23B, which is a separate lead from the lead 23A. In other words, in each of the electrical connection structures in a pair, the leads 23A and 23B are connected in conjunction to the electrode terminal 21. With such a configuration, an amount of current flowing in each of the leads 23A and 23B can be reduced compared to the configuration in which the current collecting tabs of multiple electrode groups are together joined with a single lead; thus, it is possible to reduce the thickness of each of the leads 23A and 23B. As the thickness of each of the leads 23A and 23B is reduced, a space occupied by the connecting members, such as the leads 23A and 23B, etc., becomes smaller, and it is thereby possible to increase space occupied by the multiple electrode groups 2A and 2B in the inner cavity 8. Thus, it is possible to realize a higher capacity of the electrode groups 2A and 2B, without increasing the size of the battery 1.

In the process of joining each of the paired current collecting tabs 17A to the corresponding one of the paired leads 23A by ultrasonic welding, etc., and the process of joining each of the paired current collecting tabs 17B to the corresponding one of the paired leads 23B by ultrasonic welding, etc., breakages of the current collecting tabs are reduced, joint strength is improved, and the thickness of the lead, which is the base member, is reduced compared to in the process of joining the current collecting tabs of multiple electrode groups to a single lead; thus, the processes according to the present embodiment are superior to the above compared processes and assembly efficiency is improved. Thus, by configuring a pair of the electrical connection structures in the above-described manner, it is thereby possible to improve assembly efficiency in the process of forming the electrical connection structures.

In each of the paired leads 23A, the corresponding one of the paired current collecting tabs 17A is joined with the base part main surface 37 of the lead base part 33, and the base part main surface 37 faces the side the lid member 5 is located. Similarly, in each of the paired leads 23B, the corresponding one of the paired current collecting tabs 17B is joined with the base part main surface 37 of the lead base part 33, and the base part main surface 37 faces the side the lid member 5 is located. With the above-described configuration, even when the dimension of each of the leads 23A and 23B in the height direction of the battery 1 is reduced, the joint area where the leads 23A or 23B are joined with the corresponding one of the current collecting tabs 17A and 17B is suitably ensured, and the corresponding current collecting tab 17A or 17B is appropriately joined with the lead 23A or 23B. As the dimension of each of the leads 23A and 23B in the height direction of the battery 1 is reduced, the space occupied by the leads 23A and 23B in the inner cavity 8 becomes further smaller, and it is thereby possible to further increase the space occupied by the multiple electrode groups 2A and 2B in the inner cavity 8.

In each pair of electrical connection structures, the current collecting tab 17A and 17B are arranged in a shifted layout in the lateral direction of the battery 1. Furthermore, in each of the electrical connection structures in a pair, the joint portion where the current collecting tab 17A is connected to the lead base part 33 of the lead 23A is located on the opposite side of the joint portion where the current collecting tab 17B is connected to the lead base part 33 of the lead 23B, with respect to the parts where the leads 23A and 23B are connected to the electrode terminal 21. With such a configuration, the process of joining each of the paired current collecting tabs 17A to the corresponding one of the paired leads 23A and the process of joining each of the paired current collecting tabs 17B to the corresponding one of the paired leads 23B can come to be performed more easily.

In each of the leads 23A and 23B, the lead bent part 36 is bent in the height direction of the battery 1 toward the side where the lid member 5 is located with respect to the lead protruding part 35. In each of the electrical connection structures in a pair, each of the leads 23A and 23B is connected to the electrode terminal 21 at the lead bent part 36, and the lead bent part 36 of the lead 23B is adjacent to the lead bent part 36 of the lead 23A from one side of the depth direction (thickness direction) of the battery 1. With such a configuration, even if the leads 23A and 23B are separate components, the process of connecting the leads 23A and 23B to the electrode terminal 21 in conjunction can be more easily performed in each of the electrical connection structures in a pair.

In each of the leads 23A and 23B, the boundary between each of the base part main surfaces 37 and 38 and the base part edge surface 41 takes the shape of an "R", and the boundary between each of the base part main surfaces 37 and 38 and the base part edge surface 42 takes the shape of an "R". Thus, in each of the electrical connection structures in a pair, damage of the current collecting tabs 17A due to contact between the current collecting tabs 17A and the lead 23A can be effectively prevented. Similarly, in each of the electrical connection structures in a pair, damage of the current collecting tabs 17B due to contact between the current collecting tabs 17B and the lead 23B can be effectively prevented. The vibration resistance properties, etc. of the battery 1 as a product can be thus improved.

(Modifications)

Figure 7:
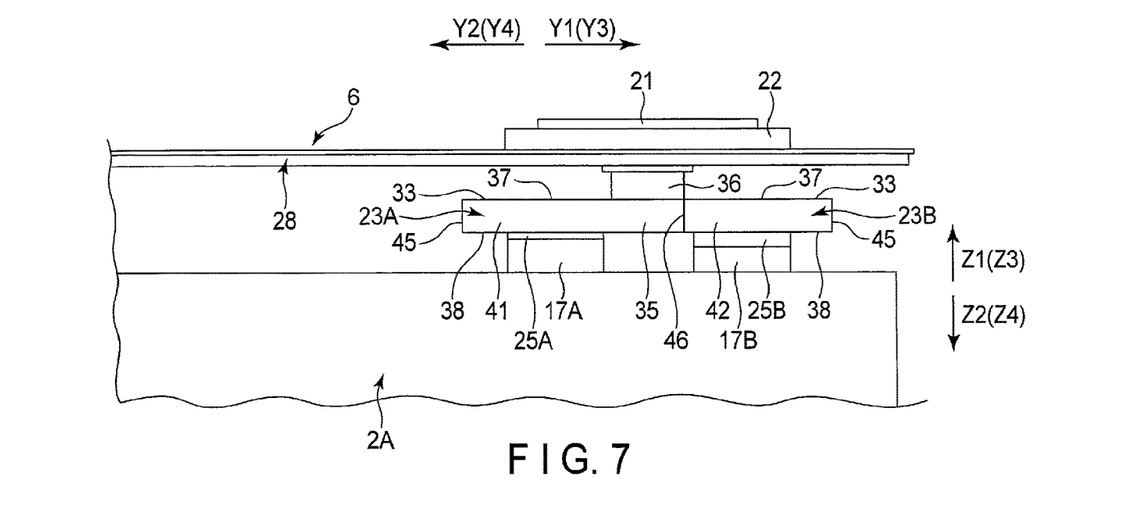
FIG. 7 is a schematic view showing a configuration of an electrical connection structure of a plurality of electrode groups with respect to an electrode terminal in a pair and the vicinity thereof, viewed from one side of the depth direction of the battery, in a battery according to a first modification.

In the first modification shown in FIG. 7, in each of the electrical connection structures in a pair, the current collecting tab (first current collecting tab) 17A is joined with the lead base part (first lead base part) 33 of the lead 23A, and the current collecting tab (second current collecting tab) 17B is joined with the lead base part (second lead base part) 33 of the lead 23B. In the present modification, in each of the leads 23A, a joint part connected to the corresponding one of the current collecting tabs 17A is formed in the base part main surface (second base part main surface) 38 of the lead base part 33. In each of the leads 23B, a joint part connected to the corresponding one of the current collecting tabs 17B is formed in the base part main surface (second base part main surface) 38 of the lead base part 33. In this modification, the base part main surface 38 faces the side where the electrode groups 2A and 2B are located according to the height direction of the battery 1 in the lead base part 33 in each of the leads 23A and 23B. Herein, FIG. 7 shows a state viewed from one side of the depth direction of the battery 1.

As mentioned above, in the present modification, in each of the leads 23A and 23B, the corresponding one of the current collecting tabs 17A and 17B is joined with the base part main surface 38 facing the side where the electrode groups 2A and 2B are located. With the above-described configuration, even when the dimension of each of the leads 23A and 23B in the height direction of the battery 1 is reduced, the joint area where the leads 23A or 23B is joined with the corresponding one of the current collecting tabs 17A and 17B is suitably ensured, and the corresponding current collecting tab 17A or 17B is appropriately joined with the lead 23A or 23B. Accordingly, as the dimension of each of the leads 23A and 23B in the height direction of the battery 1 is reduced, the space occupied by the leads 23A and 23B in the inner cavity 8 becomes smaller; for this reason, similarly to the foregoing embodiment, it is thereby possible to increase the space occupied by the multiple electrode groups 2A and 2B in the inner cavity 8.

In another modification, in at least one of the electrical connection structures, one of the current collecting tabs 17A and 17B is joined with the base part main surface 37 of the lead (corresponding one of 23A or 23B) and the other of the current collecting tabs 17A and 17B is joined with the base part main surface 38 of the lead (corresponding one of 23A or 23B). Even with such a configuration, similarly to the foregoing embodiment, etc., it is possible to reduce the space occupied by the leads 23A and 23B in the inner cavity 8, appropriately ensuring a joint area where the lead 23A or 23B is joined with the corresponding one of the current collecting tab 17A or 17B. Thus, even in the present modification, it is possible to increase a space occupied by multiple electrode groups 2A and 2B in the inner cavity 8.

Figure 8:
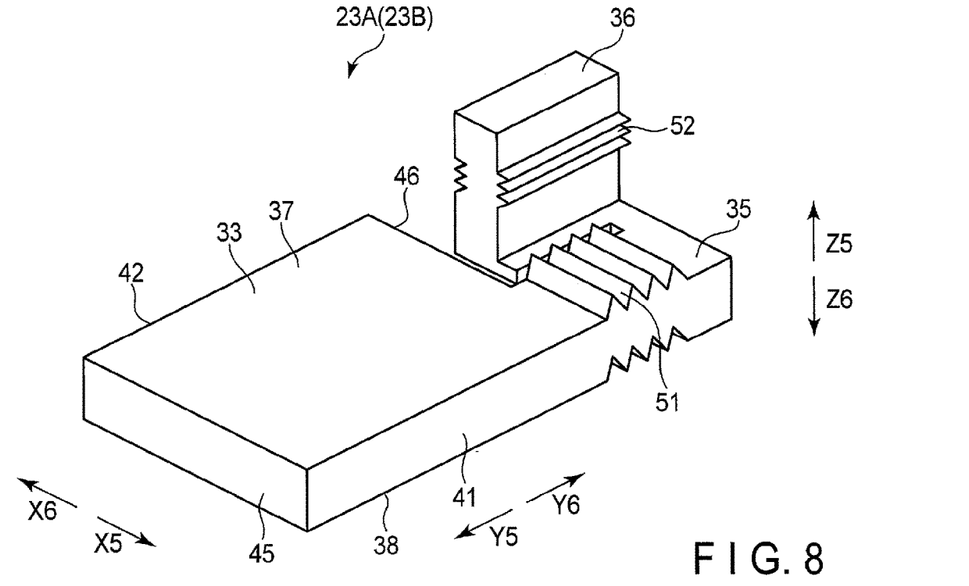
FIG. 8 is a perspective view schematically showing one of the paired leads (first lead) in a battery according to a second modification.

In the second modification shown in FIG. 8, accordion structures 51 and 52 are formed in each of the leads 23A and 23B. In each of the leads 23A and 23B, an accordion structure (first accordion structure) 51 is formed in the lead protruding part 35. In each of the leads 23A and 23B, the accordion structure 51 renders the lead protruding part 35 expandable and contractible in the lateral direction of the battery 1 (the length direction of the lead). Then, in each of the leads 23A and 23B, the accordion structure 51 renders the lead protruding part 35 vibratable in the height direction of the battery 1 (the height direction of the lead). Furthermore, in each of the leads 23A and 23B, an accordion structure (second accordion structure) 52 is formed in the lead bent part 36. In each of the leads 23A and 23B, the accordion structure 52 renders the lead bent part 36 expandable and contractible in the height direction of the battery 1 (the height direction of the lead). Then, in each of the leads 23A and 23B, the accordion structure 52 renders the lead bent part 36 vibratable in the depth direction of the battery 1 (the width direction of the lead). Also in the present modification, the lead bent part 36 is formed integrally with the lead protruding part 35. The area where the accordion structure 51 of the lead protruding part 35 is formed, however, is not connected to the lead bent part 36; rather, there is a gap between the area and the lead bent part 36. The lead bent part 36 is not connected to the base part edge surface 46 of the lead base part 33; rather, there is a gap between the lead bent part 36 and the base part edge surface 46. The operations and advantageous effects similar to those of the foregoing embodiment, etc. are achieved in the present modification.

In the present modification, vibration due to external shock applied to the battery 1 is absorbed by expansion-and-contraction and vibration of the accordion structures 51 and 52 of the leads 23A and 23B. For this reason, the resistance against vibration improves in each of the leads 23A and 23B. In each of the leads 23A and 23B, the direction in which expansion and contraction easily occurs and the direction in which vibration easily occurs differ between the accordion structures 51 and 52; therefore, vibration is appropriately absorbed regardless of the direction of vibration. Thus, resistance against vibration is further improved in each of the leads 23A and 23B. In a modification, in each of the leads 23A and 23B, only one of the accordion structures 51 or 52 is provided.

Figure 9:
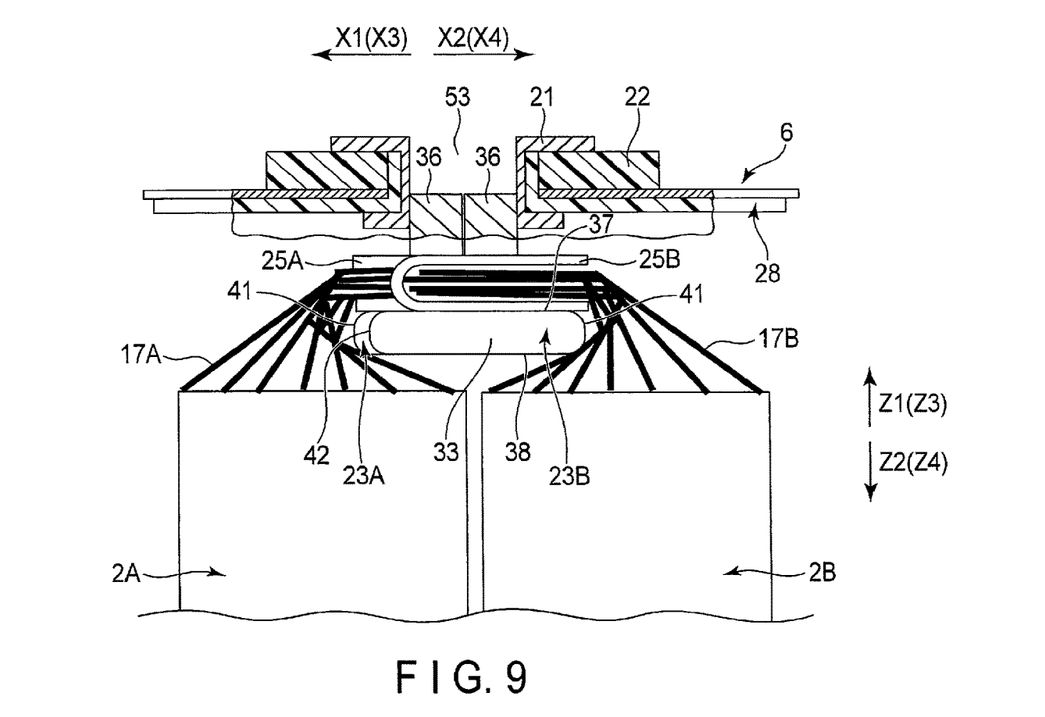
FIG. 9 is a schematic view showing a configuration of an electrical connection structure of a plurality of electrode groups with respect to an electrode terminal in a pair and the vicinity thereof, viewed from one side of the lateral direction of the battery, in a battery according to a third modification.

In the third modification shown in FIG. 9, a through-hole 53 is formed in each of the electrode terminals 21 in a pair. Each through-hole 53 penetrates the corresponding one of the electrode terminals 21 in the height direction of the battery 1. In each of the electrode terminals 21, one end of the through-hole 53 is open toward the outside of the battery 1, and the other end is open toward the inner cavity 8. In each of the electrical connection structures in a pair, the lead bent part (first lead bent part) 36 of the lead (first lead) 23A and the lead bent part (second lead bent part) 36 of the lead (second lead) 23B are jointly inserted into the through-hole 53 of the electrode terminal 21 from the inner cavity 8. In each of the electrical connection structures in a pair, the lead bent parts 36 of the leads 23A and 23B are connected to the electrode terminal 21, being inserted into the through-hole 53. Herein, FIG. 9 shows the battery 1 viewed from one side of the lateral direction, partially shown in a cross section orthogonal, or approximately orthogonal, to the lateral direction.

In the present modification, in each of the electrical connection structures, the lead bent part 36 of each of the leads 23A and 23B is joined with the peripheral surface of the through-hole 53 by laser welding, etc., thereby connecting the leads 23A and 23B to the electrode terminals 21 in conjunction. Forming the through-hole 53 in each of the electrode terminal 21 renders it easier to join the lead bent part 36 of each of the leads 23A and 23B to the peripheral surface of the through-hole 53 when each electrical connection structure is formed. Thus, the functionality in the process of forming each electrical connection structure is improved. The operations and advantageous effects similar to those of the foregoing embodiment, etc. are achieved in the present modification.

In one modification, the clip plates 25A and 25B may not be provided. In this case, in each of the electrical connection structures in a pair, the current collecting tab (first current collecting tab) 17A is directly joined with one of the base part main surfaces 37 or 38 of the lead (first lead) 23A, and the current collecting tab (second current collecting tab) 17B is directly joined with one of the base part main surface 37 or 38 of the lead (second lead) 23B.

The number of electrode groups housed in the inner cavity 8 is not limited to two, provided that number is greater than one. In one modification, three or more electrode groups are housed in the inner cavity 8. Even in this case, in each of the electrical connection structures in a pair, the current collecting tab (first current collecting tab) of the first electrode group, which is one of the three or more electrode groups, is joined with the first lead, and the current collecting tab (second current collecting tab) of the second electrode group, which is another of the three or more electrode groups different from the first electrode group, is joined with the second lead, which is separate from the first lead. The first and second leads are jointly connected to the electrode terminal in each electrical connection structure. With such a configuration, it is possible to reduce the thickness of each lead in each electrical connection structure compared to a configuration in which the current collecting tabs of the first and second electrode groups are joined together to a single lead. It is thereby possible to reduce the space occupied by the connecting members such as the leads in the inner cavity 8 and to increase the space occupied by the multiple electrode groups, similarly to the foregoing embodiment, etc.

If three or more electrode groups are housed in the inner cavity 8, it is preferable that the leads provided in a number equal to the number of electrode groups be provided separate from each other in each of the electrical connection structures in a pair. In this case, in each of the electrical connection structures in a pair, the leads to be joined differ between current collecting tabs. Furthermore, in each electrical connection structure, the leads provided in a number equal to the number of electrode groups are jointly connected to a single electrode terminal.

In the foregoing embodiment, the structure of an electric connection to the positive electrode terminal and the structure of an electric connection to the negative electrode terminal are similar to each other; however, the embodiment is not limited to this example. In a modification, only one of the electrical connection structures in a pair can be formed similarly to one of the foregoing embodiments, etc. In other words, it suffices that at least one of the electrical connection structures in a pair is formed in a manner similar to the foregoing embodiment, etc.

According to at least one of the foregoing embodiments and modifications, a first current collecting tab of a first electrode group, which is one of multiple electrode groups, is joined with a first lead, and a second current collecting tab of a second electrode group, which is another electrode group different from the first electrode group among the multiple electrode groups, is joined with a second lead, which is formed separate from the first lead. Furthermore, the first lead and the second lead are jointly connected to the electrode terminal. It is thereby possible, in a configuration in which current collecting tabs of multiple electrode groups protrude toward a side where a lid member is located, to provide a battery with which the space occupied by multiple electrode groups in an inner cavity of an exterior container can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery comprising:
   an exterior container including a bottom wall and a peripheral wall, an inner cavity open toward a side opposite a side where the bottom wall is located in the height direction being formed;
   a lid member attached to the peripheral wall of the exterior container so as to close an opening of the inner cavity;
   a plurality of electrode groups each including a positive electrode and a negative electrode and housed in the inner cavity of the exterior container, the plurality of electrode groups being separate bodies separated from each other, a first electrode group, which is one of the plurality of electrode groups, including a first current collecting tab protruding toward a side where the lid member is located, a second electrode group, which is another one of the plurality of electrode groups different from the first electrode group, including a second current collecting tab protruding toward a side where the lid member is located, and the second current collecting tab having same polarity as the first current collecting tab;
   a first lead which is formed to be a separated body separated from the plurality of electrode groups and to which the first current collecting tab is joined;
   a second lead which is formed to be a separated body separated from the first lead and the plurality of electrode groups, the second current collecting tab being joined to the second lead; and
   an electrode terminal externally exposed on an outer surface of the lid member, the first lead and the second lead being connected in conjunction to the electrode terminal,
   wherein
   each of the first lead and the second lead includes a lead base part,
   the lead base part of each of the first lead and the second lead includes a first base part main surface facing a side where the lid member is located in the height direction, and a second base part main surface facing a side where the electrode groups are located in the height direction,
   the first current collecting tab is joined, in the first lead, to the first base part main surface or the second base part main surface of the lead base part,
   the second current collecting tab is joined, in the second lead, to the first base part main surface or the second base part main surface of the lead base part;
   the first electrode group and the second electrode group are arranged side by side in a depth direction intersecting the height direction,
   the first current collecting tab and the second current collecting tab are arranged so as to be shifted from each other in a lateral direction that intersects both the height direction and the depth direction, and
   a joint part at which the first current collecting tab is joined with the lead base part of the first lead is located on an opposite side of a joint part at which the second current collecting tab is joined with the lead base part of the second lead, with respect to a connection part in which the first lead and the second lead are connected to the electrode terminal,
   the first lead includes a first protruding part that protrudes from the lead base part toward the second lead in the lateral direction, and a first lead bent part that is bent toward a side where the lid member is located with respect to the first lead protruding part,
   the second lead includes a second protruding part that protrudes from the lead base part toward the first lead in the lateral direction, and a second lead bent part that is bent toward a side where the lid member is located with respect to the second lead protruding part and that is adjacent to the first lead bent part of the first lead from one side of the depth direction,
   the first lead is connected to the electrode terminal at the first lead bent part, and
   the second lead is connected to the electrode terminal at the second lead bent part.

2. The battery according to claim 1, wherein
   each of the first lead protruding part of the first lead and the second lead protruding part of the second lead includes a first accordion structure that is expandable and contractible in the lateral direction and vibratable in the height direction.

3. The battery according to claim 1, wherein
   each of the first lead bent part of the first lead and the second lead bent part of the second lead includes a second accordion structure that is expandable and contractible in the height direction and vibratable in the depth direction.

4. The battery according to claim 1, wherein
   a through-hole penetrating the electrode terminal in the height direction is formed in the electrode terminal, and
   the first lead bent part of the first lead and the second lead bent part of the second lead are connected to the electrode terminal, being inserted into the through-hole of the electrode terminal from the inner cavity.

5. The battery according to claim 1, wherein
   the lead base part of each of the first lead and the second lead comprises:
   a first base part edge surface that constitutes an edge of one side of a depth direction which intersects the height direction in the lead base part, wherein each of a boundary between the first base part edge surface and the first base part main surface and a boundary between the first base part edge surface and the second base part main surface are formed in an arc shape; and
   a second base part edge surface that constitutes an edge of an opposite side in the depth direction with respect to the first base part edge surface of the lead base part, wherein each of a boundary between the second base part edge surface and the first base part main surface and a boundary between the second base part edge surface and the second base part main surface are formed in an arc shape.

* * * * *